(12) United States Patent
Zhou et al.

(10) Patent No.: US 10,992,419 B1
(45) Date of Patent: Apr. 27, 2021

(54) WIRELESS COMMUNICATIONS DEVICE AND METHOD FOR PERFORMING AN ANGLE MEASUREMENT

(71) Applicant: NXP B.V., Eindhoven (NL)

(72) Inventors: Jun Zhou, Irvine, CA (US); Shengyang Xu, Irvine, CA (US); Abdul Wahid Abdul Kareem, Irvine, CA (US); Radha Srinivasan, Irvine, CA (US); Brima Babatunde Ibrahim, Laguna Hills, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/816,993

(22) Filed: Mar. 12, 2020

(51) Int. Cl.
| | |
|---|---|
| *H04B 7/04* | (2017.01) |
| *H04L 1/06* | (2006.01) |
| *H04L 27/26* | (2006.01) |
| *H04B 7/0413* | (2017.01) |
| *H04L 5/00* | (2006.01) |
| *H04L 25/02* | (2006.01) |
| *H04W 24/10* | (2009.01) |
| *H04B 7/06* | (2006.01) |
| *H04W 72/04* | (2009.01) |

(52) U.S. Cl.
CPC ......... *H04L 1/0618* (2013.01); *H04B 7/0413* (2013.01); *H04B 7/0669* (2013.01); *H04L 5/0023* (2013.01); *H04L 25/0204* (2013.01); *H04L 25/0212* (2013.01); *H04L 27/2607* (2013.01); *H04L 27/2613* (2013.01); *H04W 24/10* (2013.01); *H04W 72/0446* (2013.01)

(58) Field of Classification Search
CPC ............. H04L 27/2607; H04L 27/2613; H04L 27/2662; H04L 5/0023; H04L 25/0212; H04L 25/0202
USPC ................................ 375/267, 299, 347, 349
See application file for complete search history.

(56) References Cited

U.S. PATENT DOCUMENTS

| | | | |
|---|---|---|---|
| 9,136,937 B1 * | 9/2015 | Cheng ................. | H04B 7/0805 |
| 10,056,993 B2 | 8/2018 | Clancy et al. | |
| 10,924,303 B2 * | 2/2021 | Batra ...................... | G06F 7/582 |
| 2002/0164968 A1 * | 11/2002 | Crawford ............. | H04B 7/0811 |
| | | | 455/277.1 |

(Continued)

OTHER PUBLICATIONS

Dotlic, Igor et al.; "Angle of Arrival Estimation Using Decawave DW1000 Integrated Circuits," 2017 14th Workshop on Positioning, Navigation and Communications (WPNC); Oct. 25-26, 2017; Bremen, Germany; DOI: 10.1109/WPNC.2017.8250079.

(Continued)

*Primary Examiner* — Emmanuel Bayard
(74) *Attorney, Agent, or Firm* — Daniel D. Hill

(57) ABSTRACT

A method and device using a single transmitter (TX) and/or a single receiver (RX) is provided for determining an angle measurement between the transmitter and receiver for an ultra-wideband (UWB) system. A plurality of RX antennas is coupled to the receiver and a plurality of TX antennas is coupled to the transmitter. An IEEE 802.15.4z standard provides a silent period or gap before and after scrambled timestamp sequences (STS) in a frame. An active antenna is switched to a different antenna in the gaps. This allows the angle measurements to be performed with only a single transmitter and receiver within one channel impulse response (CIR) measurement cycle.

20 Claims, 5 Drawing Sheets

(56) References Cited

U.S. PATENT DOCUMENTS

| | | | | |
|---|---|---|---|---|
| 2003/0002471 | A1* | 1/2003 | Crawford | H04B 17/336 370/343 |
| 2005/0053039 | A1* | 3/2005 | Dewan | H04M 1/72502 370/334 |
| 2005/0113048 | A1* | 5/2005 | Miyahara | H04B 7/0874 455/137 |
| 2005/0254608 | A1* | 11/2005 | Lee | H04L 1/06 375/347 |
| 2007/0230604 | A1* | 10/2007 | Nakamura | H04B 7/0808 375/260 |
| 2011/0305286 | A1* | 12/2011 | Shimezawa | H04L 27/2688 375/260 |
| 2012/0008646 | A1* | 1/2012 | Fourcand | H04J 3/0673 370/514 |
| 2012/0099682 | A1* | 4/2012 | Kuwahara | H04B 7/0894 375/343 |
| 2013/0088395 | A1* | 4/2013 | Vaarakangas | H04B 7/086 342/378 |
| 2014/0269389 | A1 | 9/2014 | Bukkfejes et al. | |
| 2014/0327579 | A1* | 11/2014 | Hart | G01S 3/38 342/374 |
| 2015/0341157 | A1* | 11/2015 | Eltawil | H04B 1/525 370/278 |
| 2018/0212669 | A1* | 7/2018 | Li | H04B 7/0604 |
| 2019/0165977 | A1* | 5/2019 | Kunert | H04N 21/6112 |
| 2019/0254113 | A1* | 8/2019 | Berger | H04L 27/2627 |
| 2019/0273636 | A1* | 9/2019 | Batra | H04B 1/69 |
| 2019/0349972 | A1* | 11/2019 | Nam | H04W 72/1284 |

OTHER PUBLICATIONS

Leong, Frank et al.; IEEE P802.15/18/0286-01-004z "Wireless Personal Area Networks," Project: IEEE P802.15 Working Group for Wireless Personal Area Networks (WPANs); Jul. 5, 2018.

Sedlacek, Petr et al. "An Overview of the IEEE 802.15.4z Standard and its Comparison to the Existing UWB Standards;" 2019 29th International Conference Radioelektronika (Radioelektronika); Apr. 16-18, 2019; Pardubice, Czech Republic; DOI: 10.1109/RADIOELEK.2019.8733537.

P802.15.4z-D05 Draft Standard for Low-Rate Wireless Networks; Amendment: Enhanced Ultra Wide-Band (UWB) Physical Layers (PHYs) and Associated Ranging Techniques; Nov. 2019.

\* cited by examiner

WIRELESS COMMUNICATIONS DEVICE AND METHOD FOR PERFORMING AN ANGLE MEASUREMENT

BACKGROUND

Field

This disclosure relates generally to wireless communications and more specifically to a method for performing an angle measurement.

Related Art

Impulse radio ultra-wideband (IR-UWB) technology as set out in IEEE standard 802.15.4 is used for indoor ranging and localization applications. The ultra-wideband (UWB) frequency range is between 3.1 and 10.6 GHz. Time-of-flight (ToF) measurement of UWB signals is used to provide distance in ranging applications in IR-UWB systems. Time-of-flight is based on first path detection on a channel impulse response (CIR) measurement.

Physical distance between two objects can be derived from one ToF measurement. The angle measurements, like angle-of-departure (AoD) and angle-of-arrival (AoA), usually require multiple measurements on ToF and phase from every transmitter (tx) and receiver (rx) pairs simultaneously. One CIR measurement cycle refers to transmission and reception of one IR-UWB frame. For example, a device with two independent transmitters and receivers is adopted to support simultaneous CIR measurements for AoD and AoA, respectively. The number of simultaneous measurements is proportional to the number of transmitter and receiver pairs with a corresponding increase in cost and power consumption.

Therefore, a need exists for a lower cost method and apparatus for angle measurements.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
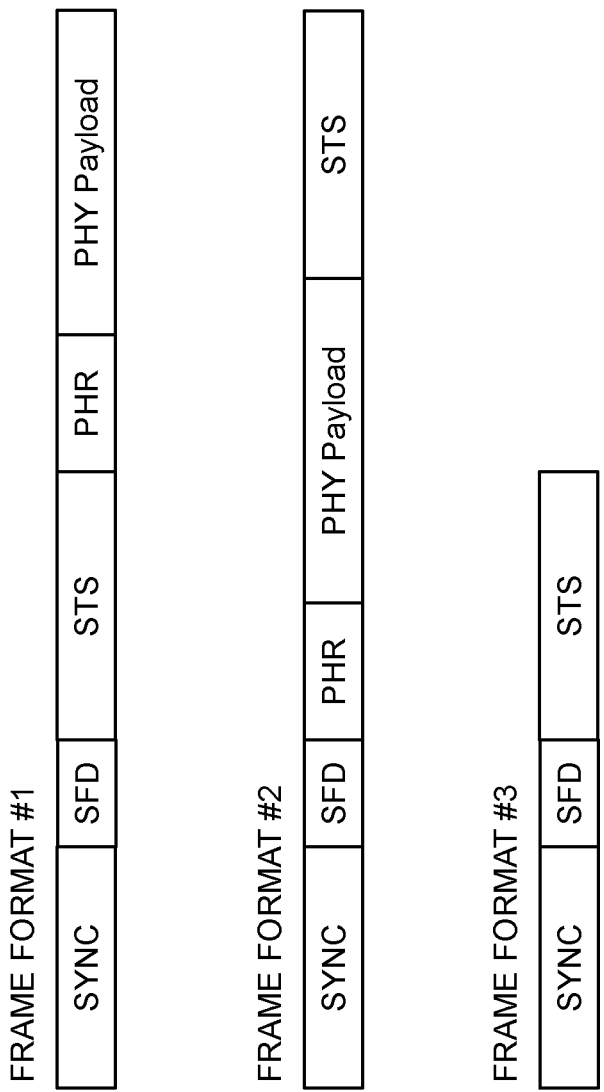
FIG. 1 illustrates three IEEE 802.15.4z frame formats that have a scrambled timestamp sequence (STS) field.

Generally, there is provided, a method and wireless communication device for determining angle measurements in an IR-UWB device using the scrambled timestamp sequence (STS) introduced in IEEE 802.15.4 and only one transmitter and receiver. The STS is based on a cryptographically secure pseudo-random number generator (CSPRNG). As taught by the IEEE 802.15.4z standard, the STS pulse sequences may be segmented in two or four blocks of active pulses encapsulated by silent intervals, or guard bands, known as "gaps" as required by the standard. In the described embodiments, the transmitter is switchably coupled to and shared by a plurality of transmitter antennas through a time-division multiplexing (TDM) scheme. Likewise, the receiver is switchably coupled to and shared by a plurality of receiver antennas using the TDM scheme. In both the transmitter and receiver, one antenna is active during transmission of the STS field. During the "gaps," another antenna is made active. Through the TDM scheme, multiple CIR measurements of the independent TX-RX antenna pairs can be performed with a single IR-UWB frame. Therefore, an IEEE 802.15.4z IR-UWB device with a single transmitter and a single receiver can perform AoA and AoD measurements, at nearly one half the system cost and power consumption compared to a system having dual transmitter and receivers.

In one embodiment, there is provided, in a wireless communications device having a receiver that is switchably connected to an antenna of a plurality of antennas, the receiver for receiving a data stream having a plurality of frames, each frame of the plurality of frames including a synchronization symbol sequence (SYNC), a start frame delimiter (SFD), and at least one scrambled timestamp sequence (STS), wherein each STS is preceded by a guard band period, and each STS is followed by another guard band period, wherein no signal energies are transmitted during guard band periods, a method for performing an angle measurement between a transmitter and the receiver, the method including: receiving the data stream from the transmitter at the receiver via a receiver antenna of the plurality of receiver antennas; switching to a different receiver antenna of the plurality of receiver antennas to be active during the guard band period preceding reception of an STS portion of a frame; receiving the STS portion with the active receiver antenna; switching to another receiver antenna of the plurality of receiver antennas to be active at the guard band period following reception of the STS portion of the frame; repeating the steps of switching receiver antennas and receiving each STS portion of the data stream; and performing the angle measurement using the received STS portion. The angle measurement may be determined using an angle-of-arrival measurement. The data stream may be received via an ultra-wideband signal. The ultra-wideband signal may be transmitted according to an IEEE 802.15.4z standard. An STS portion of a frame may further include multiple STS segments, each of the STS segments may be preceded and followed by a guard band period. The angle measurement may be determined based on a channel impulse response (CIR) measurement of one ultra-wideband frame. The method may further include: transmitting the data stream by the transmitter via a transmitter antenna of a plurality of transmitter antennas; switching to a different transmitter antenna of the plurality of transmitter antennas to be active during a guard band period preceding the transmission of an STS portion of a frame to be transmitted; transmitting the STS portion with the active transmitter antenna; switching to another transmitter antenna of the plurality of transmitter antennas to be active at a guard band period following transmission of the STS portion; and repeating the steps of switching receiver antennas and transmitting each STS portion of the data stream. The receiver may be an impulse radio ultra-wideband (IR-UWB) receiver.

In another embodiment, there is provided, a wireless communications device, including: a transmitter having an output switchably coupled to a plurality of transmitter antennas, the transmitter for transmitting a data stream to one or more mobile receivers via a connected one of the plurality of transmitter antennas, the data stream organized in frames, each frame including a bit field for providing a scrambled timestamp sequence (STS) portion for ranging with the one or more receivers, wherein when the STS portion is transmitted as part of the data stream, the STS portion is preceded by a first guard band period, and the STS portion is followed by a second guard band period, wherein no signal energies are transmitted during the first and second guard band periods, wherein the output of the transmitter is switched to a different transmitter antenna of the plurality of transmitter antennas during each of the first and second guard band periods, and wherein the STS portion is used to make an angle measurement between the transmitter and a receiver of the one or more mobile receivers. The wireless communication device may further include: a receiver having an input switchably coupled to a plurality of receiver antennas, the receiver for receiving a data stream from one or more transmitters via a connected one of the plurality of receiver antennas, the data stream organized in frames, each frame including a bit field for a STS portion for ranging with the one or more transmitters, wherein when the STS portion is received as part of the data stream, the STS portion is preceded by a first guard band period, and the STS portion is followed by a second guard band period, wherein no signal energies are transmitted during the first and second guard band periods, wherein the input of the receiver is switched to a different receiver antenna of the plurality of receiver antennas during each of the first and second guard band periods. The transmitter may be an impulse radio ultra-wideband (IR-UWB) transmitter. The frames may be organized according to the IEEE 802.15.4 standard. The transmitter may include: a digital modem circuit for generating the frames to be transmitted; a digital to analog converter (DAC) for converting the frames from a digital signal to an analog signal; and an analog front-end for receiving the analog signal and for communicating the analog signal to an active one of the plurality of transmitter antennas, wherein an antenna select signal from the digital modem circuit controls selection of the active one of the plurality of transmitter antennas. The STS portion may further include multiple STS segments, each of the STS segments preceded and followed by a guard band period. The angle measurement may be determined using an angle-of-arrival measurement.

In yet another embodiment, there is provided, a wireless communications device, comprising: a receiver having an input switchably coupled to a plurality of antennas, the receiver for receiving a data stream from one or more transmitters via a connected one of the plurality of antennas, the data stream organized in frames, each frame including a bit field for a scrambled timestamp sequence (STS) portion for ranging with the one or more transmitters, wherein when the STS portion is received as part of the data stream, the STS portion is preceded by a first guard band period, and the STS portion is followed by a second guard band period, wherein no signal energies are transmitted during the first and second guard band periods, wherein the input of the receiver is switched to a different antenna of the plurality of antennas during each of the first and second guard band periods, and wherein the STS portion is used to make an angle measurement between the receiver and a transmitter. The wireless communications device may further include: a transmitter having an output switchably coupled to a plurality of transmitter antennas, the transmitter for transmitting a data stream to one or more mobile receivers via a connected one of the plurality of transmitter antennas, the data stream organized in frames, each frame including a bit field for providing an STS portion for ranging with the one or more mobile receivers, wherein when the STS portion is transmitted as part of the data stream, the STS portion is preceded by a first guard band period, and the STS portion is followed by a second guard band period, wherein no signal energies are transmitted during the first and second guard band periods, and wherein the output of the transmitter is switched to a different transmitter antenna of the plurality of transmitter antennas during each of the first and second guard band periods. The receiver may be an impulse radio ultra-wideband (IR-UWB) receiver. The frames may be organized according to the IEEE 802.15.4 standard. The receiver may include: an analog front-end for receiving a transmitted analog signal from a transmitter; an analog-to-digital converter (ADC) for converting the received analog signal to a digital data stream; a digital modem circuit for receiving the digital data stream and down converting the digital data stream to baseband, and wherein the digital modem circuit for providing a receiver antenna select signal for controlling selection of the active one of the plurality of receiver antennas.

FIG. 1 illustrates three IEEE 802.15.4 frame formats. Each of the three frame formats includes a scrambled timestamp sequence (STS) field. Frame format #1 includes, from left to right, a synchronization symbol sequence (SYNC) field, a start of frame delimiter (SFD) field, an STS field, an optional PHY header (PHR) field, and a PHY payload field. Frame format #2 includes, from left to right, a SYNC field, a SFD field, a PHR header field, a PHY payload field, and an STS field. Frame format #3 includes, from left to right, a SYNC field, a SFD field, and an STS field.

Figure 2:
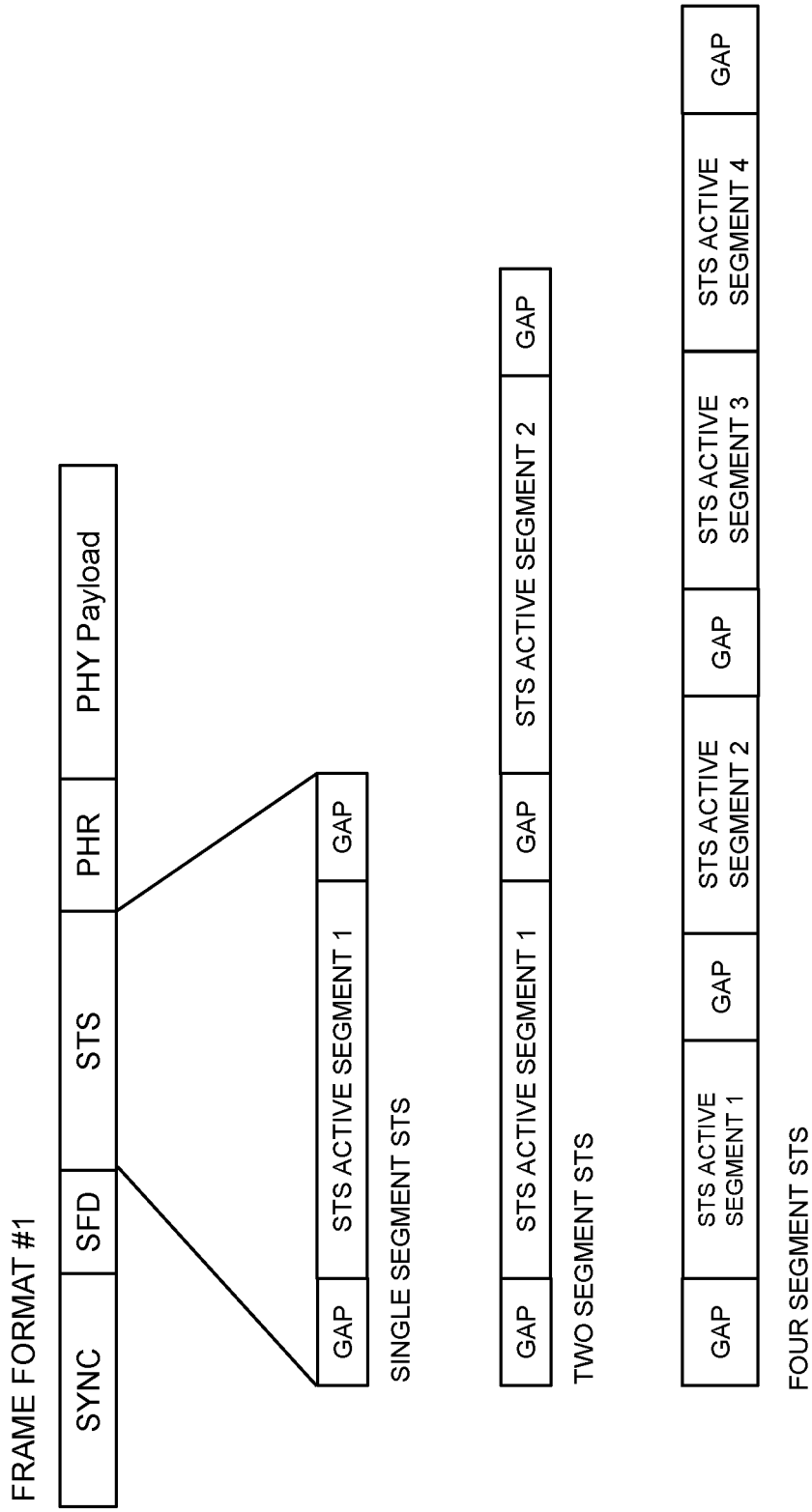
FIG. 2 illustrates three examples of an STS field as defined by IEEE 802.15.4.

FIG. 2 illustrates three examples of an STS field in more detail as defined by IEEE 802.15.4z. FIG. 2 uses frame format #1 for illustration purposes, the STS fields for the other frame formats of FIG. 1 are the same. The STS includes a sequence of pseudo randomized pulses generated using a CSPRNG based on the advanced encryption standard (AES) using a block length of 128 bits in counter mode. As illustrated in FIG. 2, the STS pulse sequences are arranged in one to four block active segments encapsulated, or flanked, by silent intervals, guard bands, or gaps, as labeled in FIG. 2. During the gaps, no signal energies are transmitted. The gap length of the silent intervals is about 1 micro second (µs). In another embodiment, the gap length may be different.

Figure 3:
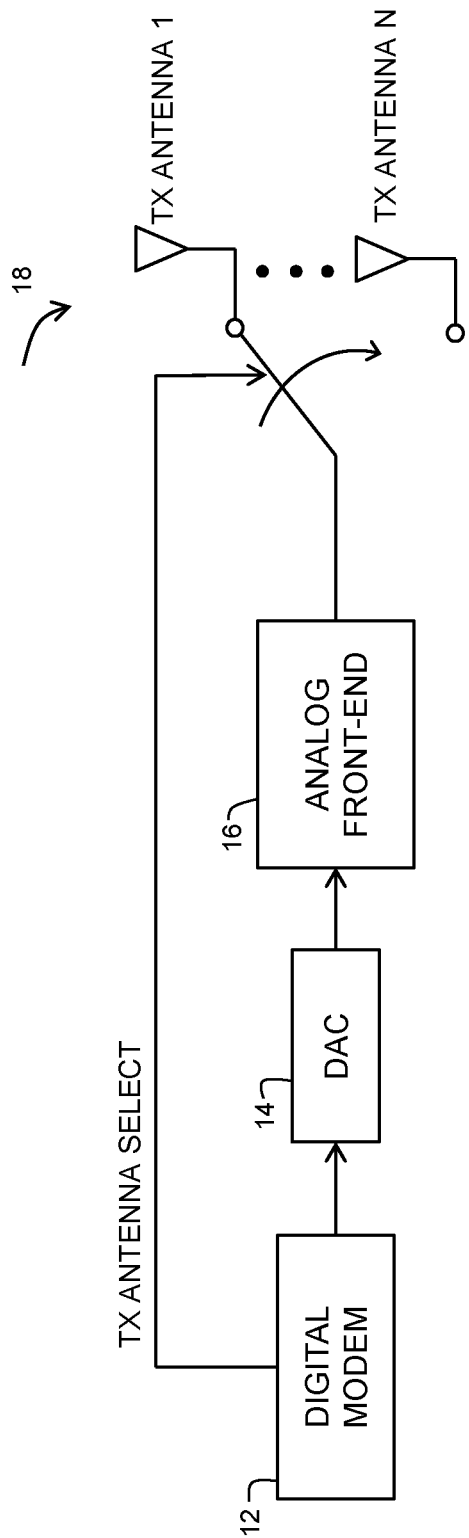
FIG. 3 illustrates an IR-UWB transmitter and antenna arrangement according to an embodiment.

FIG. 3 illustrates IR-UWB transmitter and antenna arrangement 10 according to an embodiment. In FIG. 3, one transmitter is shared among multiple transmitter antennas through TDM. Specifically, each TX antenna actively transmits during one of the STS active segments. Transmitter and antenna arrangement 10 includes a digital modem circuit 12, a digital-to-analog converter (DAC) 14, analog front-end 16, and a plurality of transmitter antennas 18. Digital modem circuit 12 generates frames to be transmitted according to one of the frame formats illustrated in FIG. 1. Digital modem circuit 12 also provides a transmitter antenna select signal (TX ANTENNA SELECT) for switching antennas between TX antenna 1 and TX antenna N, where N represents the last numbered antenna of the plurality of transmitter antennas 18. In one embodiment, N equals two. The antennas are switched according to the gap timing illustrated in FIG. 4. Digital-to-analog converter 14 receives the frames to be transmitted and converts the frames to a data stream in a modulated analog form. The analog front-end includes radio frequency (RF) circuitry for driving an active one of plurality of transmitter antennas 18.

Figure 4:
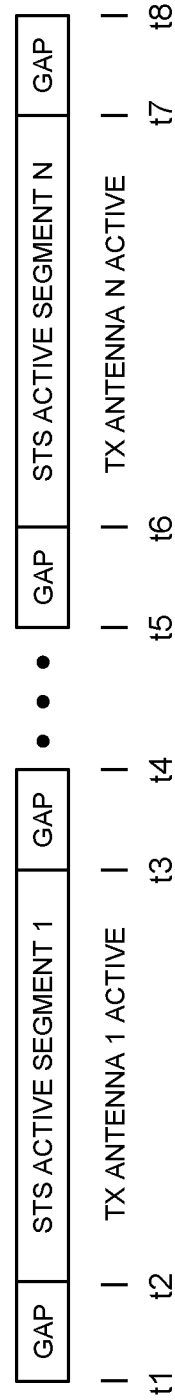
FIG. 4 illustrates a timing sequence for switching antennas for the transmitter of FIG. 3 according to an embodiment.

FIG. 4 illustrates a timing sequence for switching antennas for the transmitter of FIG. 3 according to an embodiment. If frame format #1 is used as illustrated in FIG. 2, prior to time t1, one of the TX antennas was used to transmit the SYNC and SFD portions of frame format #1. During a gap period between times t1 and t2, the transmitter antenna is switched to TX antenna 1. During the STS active segment 1 between times t2 and t3, TX antenna 1 is active to transmit the STS portion of the frame. The transmitter antenna is again switched in the gap between times t3 and t4, and the next TX antenna is selected to be active. Antenna switching repeats for all the active segments of a frame as illustrated in the gaps between times t5 and t6 and times t7 and t8. After TX antenna N is selected, the antenna selection starts over with TX antenna 1.

Figure 5:
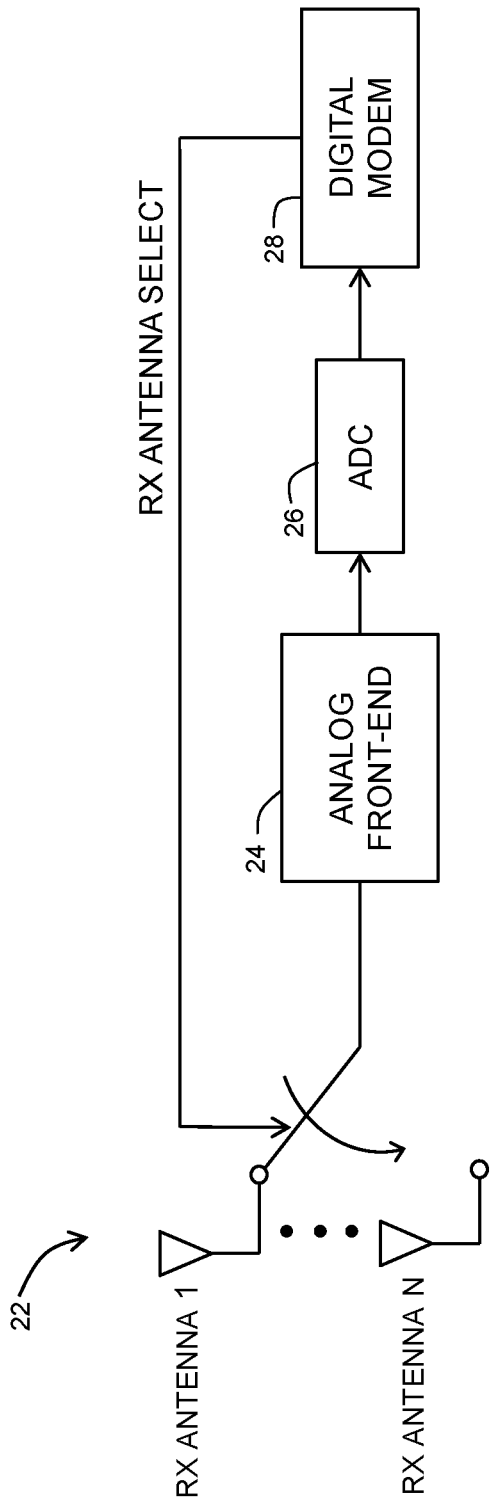
FIG. 5 illustrates an IR-UWB receiver and antenna arrangement according to an embodiment.

FIG. 5 illustrates an IR-UWB receiver and antenna arrangement 20 according to an embodiment. In FIG. 5, one receiver is shared among multiple receiver antennas through TDM. Specifically, each RX antenna actively receives a transmitted signal during one of the STS active segments. Receiver and antenna arrangement 20 includes a plurality of receiver antennas 22, analog front-end 24, analog-to-digital converter (ADC) 26, and digital modem 28. A modulated RF analog data stream is received by an active one of plurality of receiver antennas 22. Analog front-end 24 receives the RF analog data stream and performs processing and down conversion to a form that can be converted to a digital signal by ADC 26. Digital modem circuit 28 converts the digital signals to baseband according to one of the frame formats illustrated in FIG. 1. Digital modem circuit 28 also provides a receiver antenna select signal (RX ANTENNA SELECT) for switching antennas between RX antenna 1 and RX antenna N, where N represents the last numbered antenna of the plurality of antennas 22. In one embodiment, N equals two. The receiver antennas are switched according to the gap timing illustrated in FIG. 6.

Figure 6:
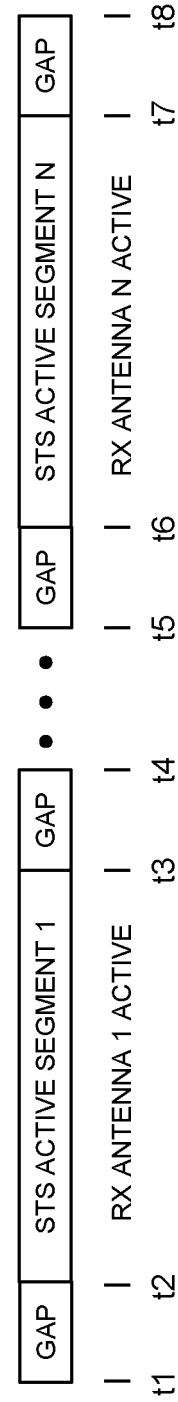
FIG. 6 illustrates a timing sequence for switching antennas in the receiver of FIG. 5 according to an embodiment.

FIG. 6 illustrates a timing sequence for switching antennas in the receiver of FIG. 5 according to an embodiment. If frame format #1 is used as illustrated in FIG. 2, prior to time t1, one of the RX antennas was used to receive the SYNC and SFD portions of frame format #1. During a gap period between times t1 and t2, the active receiver antenna is switched to RX antenna 1. During the STS active segment 1 between times t2 and t3, RX antenna 1 is active. The receiver antenna is again switched in the gap between times t3 and t4, and the next RX antenna is selected to be active. Antenna switching repeats for all the active segments of a frame as illustrated in the gaps between times t5 and t6 and times t7 and t8.

Using a single transmitter and receiver as described, an angle of arrival (AoA) and angle of departure (AoD) measurement can be performed with using the antenna switching schedule using the STS segments and gap periods of the IEEE 802.15.4z standard. The AoA and AoD measurements can be completed within one IR-UWB CIR measurement cycle. The AoA and AoD measurements can be used for determining the positions of devices relative to each other by estimating the differences in arrival times or phases of an incoming signal at different antennas in a known antenna arrangement.

The angle measurement calculation is described for an RX antenna array with two antennas (R×1 and R×2). An antenna separation is known and represented by $\beta\lambda_c$, where $\lambda_c$ is the wavelength of a carrier frequency and $\beta$ is a normalized separation, normalized to $\lambda_c$. For example, for a half wavelength @ 7.9872 GHz (Ch9) $\lambda_c \rightarrow \sim 1.88$ cm. Assume that l is the MultiPath Component (MPC) index and k is the RX antenna index, where l=0, 1, ..., L−1, and k=1,2. Also, $d_l^{(k)}$ is a propagation distance between a transmitter and a receiver antenna and $\tau_l^{(k)}$ is Time-of-Arrival (ToA) between the transmitter and receiver antennas, so that $\tau_l^{(k)}=d_l^{(k)}/c$. A carrier Phase-of-Arrival (PoA) $\theta_l^{(k)}$ between TX and RXs is $\theta_l^{(k)}=2\pi f_c \tau_l^{(k)}$.

Figure 7:
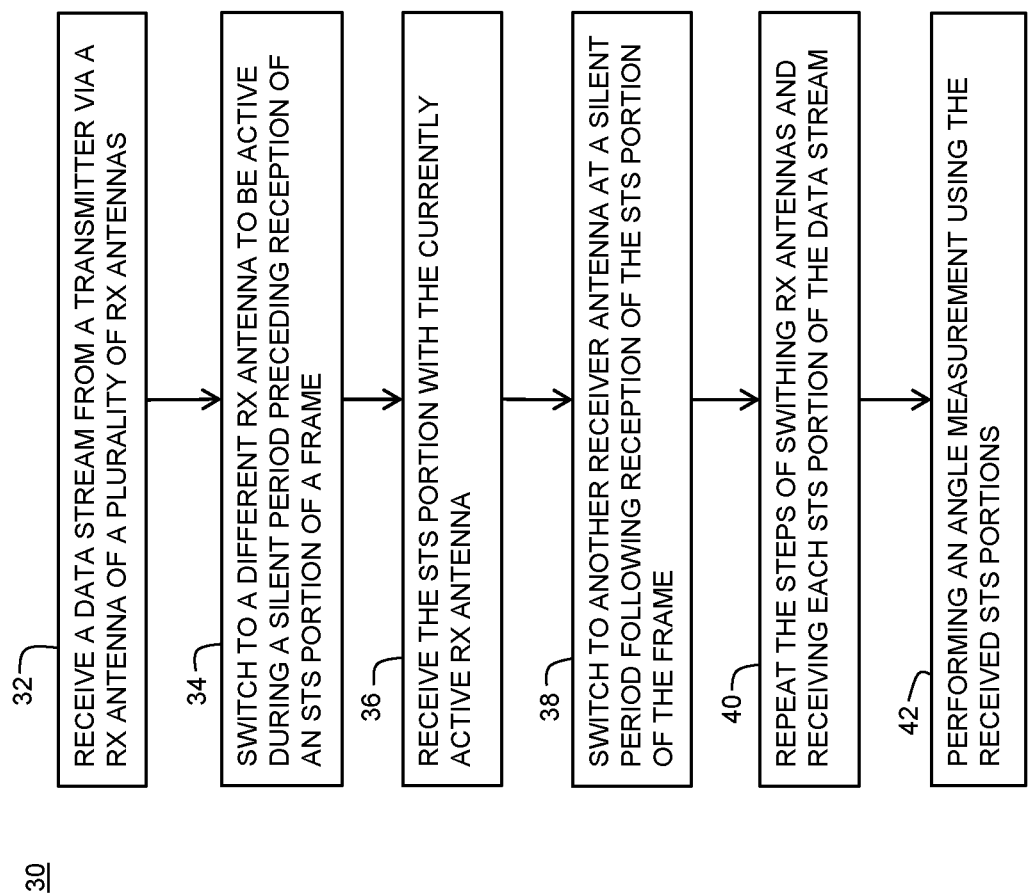
FIG. 7 illustrates a flowchart of a method for performing an angle measurement according to an embodiment.

FIG. 7 illustrates a flowchart of method 30 for performing an angle measurement according to an embodiment. The method is described using a IR-UWB receiver. However, the steps for switching the active antenna is also applicable to an IR-UWB transmitter. Method 30 begins at step 32. At step 32, a data stream is received from a transmitter via an active one of a plurality of receiver antennas, such as plurality of RX antennas 22 illustrated above in FIG. 5. At step 34, the receiver switches to a different RX antenna during a silent period (gap) preceding reception of an STS portion of a frame as illustrated at FIG. 6 between times t1 and t2. At step 36, the STS portion of the frame is received with the active RX antenna. At step 38, the receiver antennas are again switched during the silent period following the STS portion as illustrated at times t3 and t4. At step 40, steps 34-38 are repeated for each STS portion encountered. At step 42, an angle measurement is performed using the received STS portions.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a wireless communications device having a receiver that is switchably connected to an antenna of a plurality of antennas, the receiver for receiving a data stream having a plurality of frames, each frame of the plurality of frames including a synchronization symbol sequence (SYNC), a start frame delimiter (SFD), and at least one scrambled timestamp sequence (STS), wherein each STS is preceded by a guard band period, and each STS is followed by another guard band period, wherein no signal energies are transmitted and received during guard band periods, a method for performing an angle measurement between a transmitter and the receiver, the method comprising:
    receiving the data stream from the transmitter at the receiver via a receiver antenna of the plurality of receiver antennas;
    switching to a different receiver antenna of the plurality of receiver antennas to be active during the guard band period preceding reception of an STS portion of a frame;
    receiving the STS portion with the active receiver antenna;
    switching to another receiver antenna of the plurality of receiver antennas to be active at the guard band period following reception of the STS portion of the frame;
    repeating the steps of switching receiver antennas and receiving each STS portion of the data stream; and
    performing the angle measurement using the received STS portion.

2. The method of claim 1, wherein the angle measurement is determined using an angle-of-arrival measurement.

3. The method of claim 1, wherein the data stream is received via an ultra-wideband signal.

4. The method of claim 3, wherein the ultra-wideband signal is transmitted according to an IEEE 802.15.4z standard.

5. The method of claim 1, wherein an STS portion of a frame further comprises multiple STS segments, each of the STS segments preceded and followed by a guard band period.

6. The method of claim 1, wherein the angle measurement is determined based on a channel impulse response (CIR) measurement of one ultra-wideband frame.

7. The method of claim 1, further comprising:
    transmitting the data stream by the transmitter via a transmitter antenna of a plurality of transmitter antennas;
    switching to a different transmitter antenna of the plurality of transmitter antennas to be active during a guard band period preceding the transmission of an STS portion of a frame to be transmitted;
    transmitting the STS portion with the active transmitter antenna;
    switching to another transmitter antenna of the plurality of transmitter antennas to be active at a guard band period following transmission of the STS portion; and
    repeating the steps of switching receiver antennas and transmitting each STS portion of the data stream.

8. The method of claim 1, wherein the receiver is an impulse radio ultra-wideband (IR-UWB) receiver.

9. A wireless communications device, comprising:
    a transmitter having an output switchably coupled to a plurality of transmitter antennas, the transmitter for transmitting a data stream to one or more mobile receivers via a connected one of the plurality of transmitter antennas, the data stream organized in frames, each frame including a bit field for providing a scrambled timestamp sequence (STS) portion for ranging with the one or more receivers, wherein when the STS portion is transmitted as part of the data stream, the STS portion is preceded by a first guard band period, and the STS portion is followed by a second guard band period, wherein no signal energies are transmitted during the first and second guard band periods, wherein the output of the transmitter is switched to a different transmitter antenna of the plurality of transmitter antennas during each of the first and second guard band periods, and wherein the STS portion is used to make an angle measurement between the transmitter and a receiver of the one or more mobile receivers.

10. The wireless communication device of claim 9, further comprising:
    a receiver having an input switchably coupled to a plurality of receiver antennas, the receiver for receiving a data stream from one or more transmitters via a connected one of the plurality of receiver antennas, the data stream organized in frames, each frame including a bit field for a STS portion for ranging with the one or more transmitters, wherein when the STS portion is received as part of the data stream, the STS portion is preceded by a first guard band period, and the STS portion is followed by a second guard band period, wherein no signal energies are transmitted and received during the first and second guard band periods, and wherein the input of the receiver is switched to a different receiver antenna of the plurality of receiver antennas during each of the first and second guard band periods.

11. The wireless communication device of claim 9, wherein the transmitter is an impulse radio ultra-wideband (IR-UWB) transmitter.

12. The wireless communication device of claim 9, wherein the frames are organized according to the IEEE 802.15.4 standard.

13. The wireless communication device of claim 9, wherein the transmitter comprises:
    a digital modem circuit for generating the frames to be transmitted;
    a digital to analog converter (DAC) for converting the frames from a digital signal to an analog signal; and
    an analog front-end for receiving the analog signal and for communicating the analog signal to an active one of the plurality of transmitter antennas, wherein an antenna select signal from the digital modem circuit controls selection of the active one of the plurality of transmitter antennas.

14. The wireless communication device of claim 9, wherein the STS portion further comprises multiple STS segments, each of the STS segments preceded and followed by a guard band period.

15. The wireless communication device of claim 9, wherein the angle measurement is determined using an angle-of-arrival measurement.

16. A wireless communications device, comprising:
    a receiver having an input switchably coupled to a plurality of antennas, the receiver for receiving a data stream from one or more transmitters via a connected one of the plurality of antennas, the data stream organized in frames, each frame including a bit field for a scrambled timestamp sequence (STS) portion for ranging with the one or more transmitters, wherein when the STS portion is received as part of the data stream, the STS portion is preceded by a first guard band period, and the STS portion is followed by a second guard band period, wherein no signal energies are transmitted and received during the first and second guard band periods, wherein the input of the receiver is switched to a different antenna of the plurality of antennas during each of the first and second guard band periods, and wherein the STS portion is used to make an angle measurement between the receiver and a transmitter.

17. The wireless communications device of claim 16, further comprising:
a transmitter having an output switchably coupled to a plurality of transmitter antennas, the transmitter for transmitting a data stream to one or more mobile receivers via a connected one of the plurality of transmitter antennas, the data stream organized in frames, each frame including a bit field for providing an STS portion for ranging with the one or more mobile receivers, wherein when the STS portion is transmitted as part of the data stream, the STS portion is preceded by a first guard band period, and the STS portion is followed by a second guard band period, wherein no signal energies are transmitted during the first and second guard band periods, and wherein the output of the transmitter is switched to a different transmitter antenna of the plurality of transmitter antennas during each of the first and second guard band periods.

18. The wireless communication device of claim 16, wherein the receiver is an impulse radio ultra-wideband (IR-UWB) receiver.

19. The wireless communication device of claim 16, wherein the frames are organized according to the IEEE 802.15.4 standard.

20. The wireless communication device of claim 16, wherein the receiver comprises:
an analog front-end for receiving a transmitted analog signal from a transmitter;
an analog-to-digital converter (ADC) for converting the received analog signal to a digital data stream;
a digital modem circuit for receiving the digital data stream and down converting the digital data stream to baseband, and wherein the digital modem circuit for providing a receiver antenna select signal for controlling selection of the active one of the plurality of receiver antennas.

* * * * *